(12) United States Patent
Missler et al.

(10) Patent No.: US 6,359,239 B1
(45) Date of Patent: Mar. 19, 2002

(54) CUTTING BOARD WITH INTEGRAL SCALE

(76) Inventors: Leonard R. Missler, 1079 Eaglepass Ct., Chesterfield, MO (US) 63017; Walter F. Lewis, 10271 Meadowood, Overland, MO (US) 63114

( * ) Notice: Subject to any disclaimer, the term of this patent is extended or adjusted under 35 U.S.C. 154(b) by 0 days.

(21) Appl. No.: 09/492,909

(22) Filed: Jan. 27, 2000

(51) Int. Cl.⁷ .......................... G01G 19/40; G01G 19/00
(52) U.S. Cl. ................. 177/25.16; 177/25.19; 177/177; 177/239; 177/245; 708/133; 708/160; 705/416
(58) Field of Search .............................. 177/245, 25.16, 177/25.19, 238, 239, 243, 124, 173, 177; 702/173; 705/416; 708/133, 160

(56) References Cited

U.S. PATENT DOCUMENTS

| | | | |
|---|---|---|---|
| 226,083 A | * 3/1880 | Noir et al. ................ 177/245 |
| 734,663 A | 7/1903 | Bower ...................... 269/302.1 |
| 2,834,388 A | 5/1958 | Meyer .......................... 83/77 |
| D199,693 S | 12/1964 | Hohmann .................... D6/169 |
| 3,444,943 A | * 5/1969 | Tytus ......................... 177/180 |
| 3,452,833 A | * 7/1969 | Wolters ....................... 177/245 |
| 4,055,753 A | * 10/1977 | Rogers et al. .............. 177/177 |
| 4,364,442 A | * 12/1982 | Flickinger ................... 177/177 |
| 4,447,051 A | 5/1984 | Price ........................ 269/302.1 |
| 4,526,246 A | * 7/1985 | Patorary ..................... 177/179 |
| D304,277 S | 10/1989 | Wolff et al. | |
| 4,911,256 A | * 3/1990 | Attikiouzel .............. 177/25.16 |
| D315,110 S | 3/1991 | Slater .......................... D10/88 |
| 5,203,419 A | * 4/1993 | Douglas ...................... 177/177 |
| D372,176 S | 7/1996 | Meisner ....................... D7/698 |
| 5,666,866 A | 9/1997 | Huang et al. ............... 177/238 |
| D403,976 S | 1/1999 | Suzuki et al. ................ D10/88 |
| 6,013,878 A | * 1/2000 | Schwartz et al. ........ 177/25.13 |

* cited by examiner

*Primary Examiner*—Randy W. Gibson
(74) *Attorney, Agent, or Firm*—Polster, Lieder, Woodruff & Lucchesi, LC

(57) ABSTRACT

A cutting board suitable for commercial or non-commercial purposes in which food can be cut on a cutting surface of the cutting board surface and slid quickly and simply to a separate scale weighing surface of the cutting board surface to be weighed. The weighing surface on which the food is weighed is separately supported by a scale and move upwardly and downwardly independent of the cutting area. The cutting board also includes a visual display that displays information representative of the food, such as, for example, the weight of the food resting on the scale surface. A control panel includes one or more selector switches that allow the user to customize information displayed on the visual display and input information representative of the food. The cutting surface, weighing surface, visual display and control panel are sealed as to prevent food, liquid, washing solution, or the like, from entering the cutting board. The cutting board preferably includes an internally disposed battery for providing power to the scale, display and associated electrical circuitry. The orientation of the read-out may be inverted by a selector switch so that the board may be turned around to accommodate either a left-handed or a right-handed user.

13 Claims, 4 Drawing Sheets

6,359,239 B1

CUTTING BOARD WITH INTEGRAL SCALE

CROSS-REFERENCE TO RELATED APPLICATIONS

None

STATEMENT REGARDING FEDERALLY SPONSORED RESEARCH OR DEVELOPMENT

Not Applicable.

BACKGROUND OF THE INVENTION

This invention relates to cutting boards used for food preparation, specifically to a cutting board that incorporates a scale suitable for weighing food.

When vending, preparing, or otherwise handling food, it is often desirable or necessary to know with some exactitude the amount of food being handled. For instance, U.S. Pat. Nos. D304,277 and D372,176 display ornamental designs for cutting boards with physical features that allow for measuring food volume.

When preparing food for consumption, a specific amount of food is often desired. Recipes often will call for a specific weight amount of food. Diet plans often prescribe a specific weight amount of a particular food. As well, dieters often track consumption of particular food items, or food in general.

Those in the food industry often serve a precise amount of food. For example, a restaurant may weigh meat or fish before or after cooking. The weight of bread dough, such as for a pizza, may be weighed before being cooked.

At present, one interested in the weight of a food must guess at the weight based upon learning what the desired weight looks like. Then, the food must be transferred to a separate scale to weigh. If the food is not close enough to the desired amount, it must be returned to the cutting board.

The food is not always simple to transfer between a cutting surface and a scale. For instance, cooked meat may drip and cooked fish is difficult to prevent from breaking into pieces.

For these reasons, it is desirable to have a cutting board or surface with which the food can be weighed simply and quickly without having to move the food to a separate scale. It is also desirable that the food can be returned to a cutting surface simply and quickly.

BRIEF SUMMARY OF THE INVENTION

Accordingly, one object of the present invention is to provide a new and improved cutting board having separate areas for cutting food and for weighing food, so that large portions can be placed on the cutting surface and cut into smaller pieces, and then the smaller pieces can be slid onto the weighing area without removing either portion from the cutting board.

Another object of the present invention is to provide separate areas for cutting and weighing such that cutting is not done on the weighing area as the mechanisms and calibration for weighing food may be damaged if cutting is done on an active scale.

Another object of the present invention is to provide a weight readout for the scale.

Another object of the present invention is to provide a selector switch allowing a user to choose the units of measurement in which the weight is displayed.

Another object of the present invention is to provide a selector switch allowing a user to choose the orientation in which the weight readout displays the measured weight.

Another object of the present invention is to provide a control panel having one or more selector switches that allow a user to input information such as, specifying certain parameters to be measured or inputting information regarding the type of food being measured.

Another object of the present invention is to provide a selector switch allowing a user to chose whether the calories or weight is displayed.

Another object of the present invention is to provide a selector switch which allows user input to identify the food placed on the scale so that a microprocessor disposed in the cutting board can calculate and display the calories based upon the weight of the particular food.

These and other objects and advantages will become apparent to those skilled in the art in light of the following disclosure and accompanying drawings.

In accordance with the invention, generally stated, a cutting board having a substantially flat cutting surface and a scale disposed in a cavity formed in the cutting board for weighing food is disclosed. The scale has a weighing surface on which food is placed to measure the weight of the food thereon. The weighing surface preferably is substantially coplanar with the cutting surface. Food can be cut on the cutting surface, and then transferred to the active weighing area to determine the weight of the food. The cutting surface can be constructed from a variety of suitable materials such as, for example, metal, polymer or any other material conventionally used as a cutting surface. Wood can be used for the cutting surface as well, though governmental health codes for professional food service often prohibit the use of porous material such as wood in the preparation of food.

In the preferred embodiment, the top surface of the cutting board further includes a visual display for indicating the weight of the object or food placed on the scale. The dimensions of the cutting area, weighing area, and display in relation to each other may be varied depending on the size of the overall unit and the purposes to which it is to serve.

The preferred embodiment also includes a control panel having input device that allow a user to input information such as, for example, specifying certain parameters to be measured or displayed. The input device of the control panel preferably includes one or more selector switches. In one embodiment, selector switches are provided that allow the user to 1) select the units of weight measurement desired for the readout, 2) select whether the readout displays weight or calories, 3) identify a particular food so that calories associated with that food can be determined, and 4) specify the orientation of the readout to the user. In order for the cutting board to be adaptable for either a left-handed user or a right-handed user, as the ease and comfort of the cutting board may be different for left or right-handed people, the orientation of the readout may be inverted so the user may choose on which side is most comfortable to be located. Preferably, the control panel and associated selector switches are substantially co-planar with the top surface of the cutting board, though the control panel can be on the side or bottom.

Data processing circuitry is in electrical communication with the input device or switch to process information input by the user and generated by the scale. The circuitry preferably is microprocessor based, and controls data displayed on the visual display.

Other objects and features will be apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

In the drawings.

Corresponding reference numerals will be used throughout the several views of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention.

Figure 1:
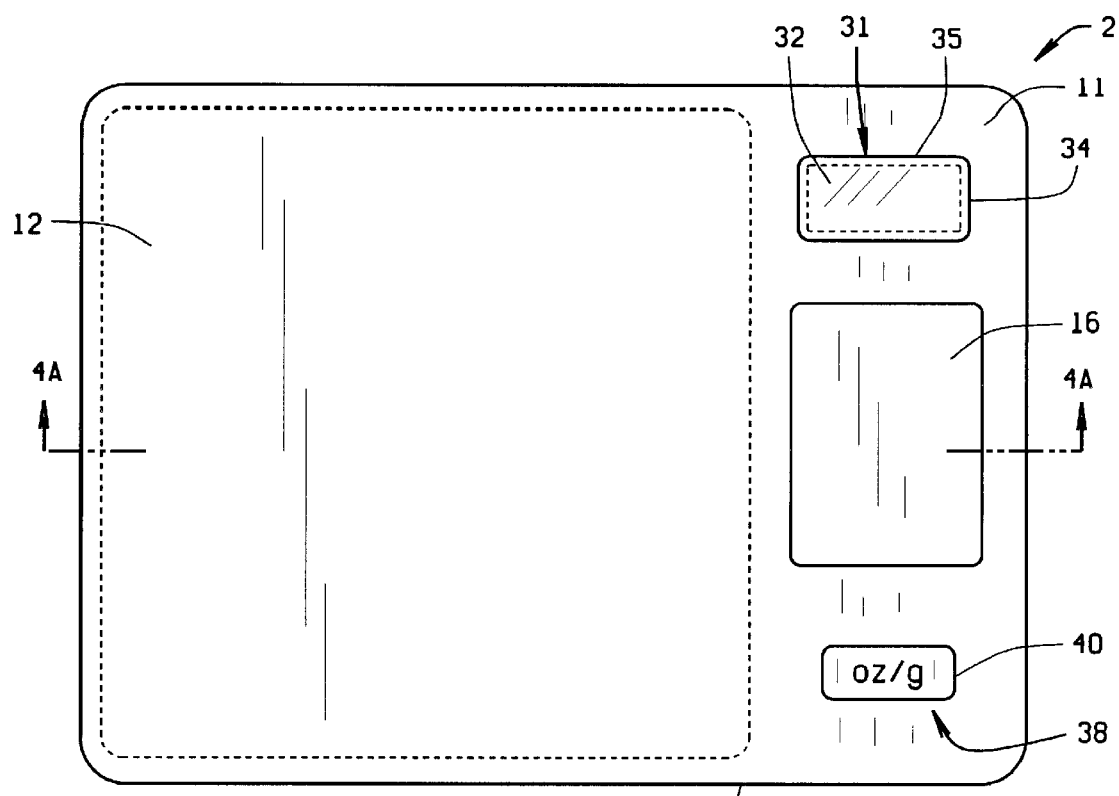
FIG. 1 is a top plan view of the cutting board of the present invention showing the cutting surface, scale weighing surface, visual display, and selector switch.

Referring to FIG. 1, a cutting board 2 of the present invention is depicted. The cutting board generally includes a housing 10 having a top surface 11 that includes a cutting surface area 12 and a weighing scale surface 16 that is substantially co-planar with the cutting surface 12. This allows food to be cut on the cutting surface 12, and then all or a portion of the food to be moved or slid onto the weighing surface 16 to determine the weight of the food thereon. As discussed in greater detail below, the scale surface 16 is supported by a scale 20 that is disposed within the housing 10. A visual display 32 (discussed below) also is provided to display certain information, such as, for example, the measured weight or calories of the food on the scale surface 16. In this embodiment, if the display 32 indicates insufficient food is on the scale 20, additional food can be easily cut on the cutting surface 12 and slid onto the scale surface 16 until the desired food weight is obtained. Similarly, if the visual display 32 indicates excessive food is on the scale 20, portions of the food can be easily removed or slid back onto the cutting surface 12 until the desired weight is obtained. Providing separate cutting and weighing surfaces 12, 16, respectively, further protects mechanisms and calibration associated with the scale 20 from damage.

Figure 2:
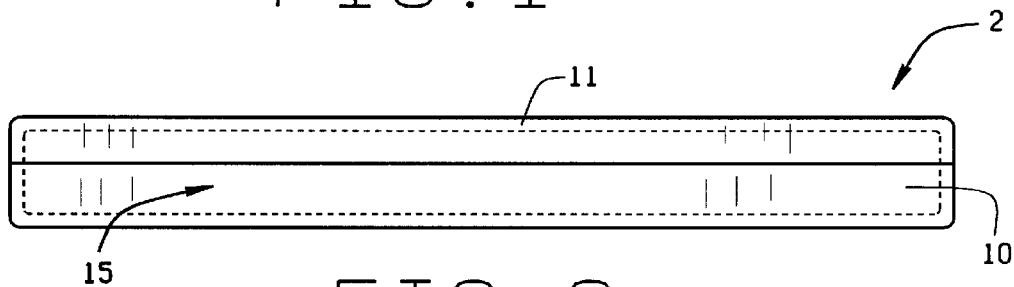
FIG. 2 is a side elevational view of the cutting board.
Figure 4A:
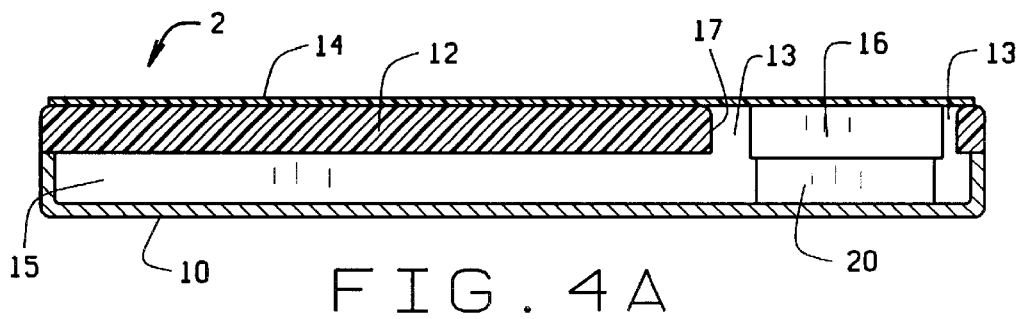
FIG. 4a is a cross-sectional view taken along line 4—4 in FIG. 1, showing a continuous membrane on the top surface of the cutting board that prevents fluid or food entry into a cavity of the cutting board.

The cutting surface 12 preferably is constructed from a generally hard material suitable for use as a cutting board such as, for example, metal, plastic or other suitable polymers. The housing 10 can be formed integral with the cutting surface 12 (FIG. 3), or may be a separate component on which the cutting surface 12 is mounted (FIG. 2). When the housing 10 and cutting surface 12 are separate components, the two components 10, 12 are connected with sealing means to prevent food, liquid, washing solution or the like from entering an internal cavity 15 of the housing 10 (FIGS. 4a and 4b). In the preferred embodiment shown in FIG. 4a, the sealing means is a clear, thin continuous membrane 14 that is secured to the top surface 11 of the housing to restrict fluid entry into the cavity 15. The membrane preferably is scratch-resistant and constructed from a material such as, for example, thin flexible film sold by E.I. DuPont DeNemours and Co., of Wilmington, Del., under the federally registered trademark MYLAR.

Figure 3:
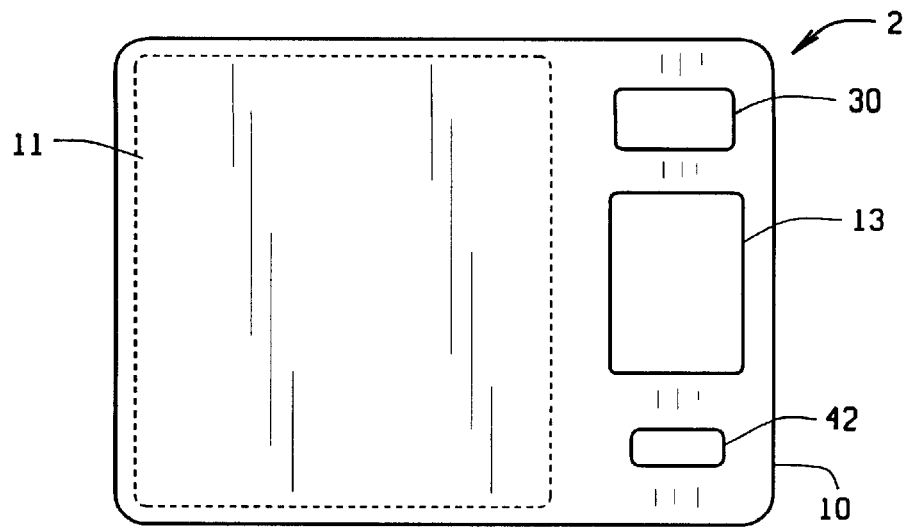
FIG. 3 is a top plan view of the housing, showing openings adapted to receive the visual display, scale and selector switch.
Figure 4B:
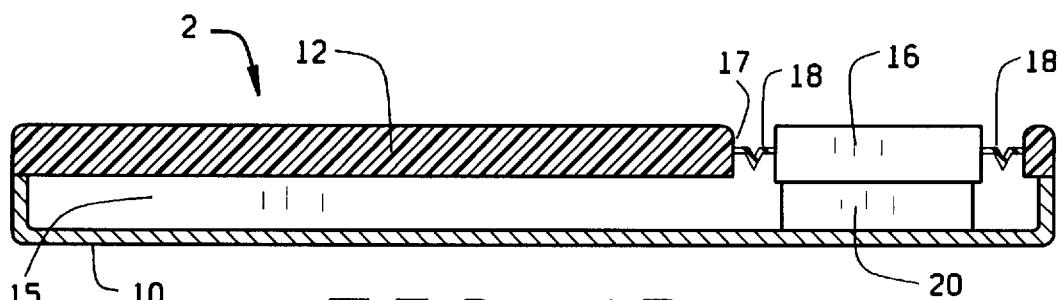
FIG. 4b is a cross-sectional view similar to that shown in FIG. 4a, showing an alternative embodiment of the cutting board having a pleated seal extending between the scale area and the cutting surface.

As shown in FIG. 3, the top surface 11 of the housing 10 further includes an opening 13 sized to accommodate the weighing surface 16. In the preferred embodiment, the continuous membrane covering the top surface 11 prevents fluid entry into the cavity 15 via gaps in between the scale surface 16 and the cutting surface 12 (FIG. 4a). Alternatively, the scale surface 16 and cutting surface 12 can be connected by a recessed flexible seal 18, depicted in FIG. 4b, that extends between the periphery of the scale surface 16 and edges 17 of the opening 13 of the cutting surface 12 that define the opening 13. In this embodiment, the flexible seal 18 preferably is recessed from the cutting surface 12 to prevent errant slicing of the seal 18 by cutting utensils. The flexible seal 18 has a pleated shape and is easily pliable to allow the scale surface 16 to depress when food is placed on it. The pleated configuration of the seal 18 allows for proper measurement of food weight by permitting the scale surface 16 to move upwardly and downwardly independently of the cutting surface 12.

As discussed above, the scale surface 16 is supported by scale 20. The scale 20 can be any conventional weighing mechanism sized to be accommodated within the cavity 15 of the housing 10. The scale is designed to measure weight of an object placed on the weighing surface 16 in any standard units of measurement, such as pounds or kilograms, or less. The unit of measurement preferably can be selected by the user as either grams, ounces, or calories, by means of one or more selector switches 40 (discussed below). In one embodiment that is suitable for commercial purposes, the scale 20 includes a weighing mechanism having accuracy suitable for commercial use. Such scales are known in the art. In the preferred embodiment, the scale is an electronic strain gauge-type scale. The scale 20 measures the weight of an object placed on the weighing surface 16, and generates an output signal representative of the measured weight that is supplied to a microprocessor 100 for further processing and display (see discussion below). The scale 20 and associated electrical components are disposed inside the cavity 15 of the housing 10 so that the top surface 16 of the scale is substantially co-planar with the cutting surface 12.

Figure 5A:
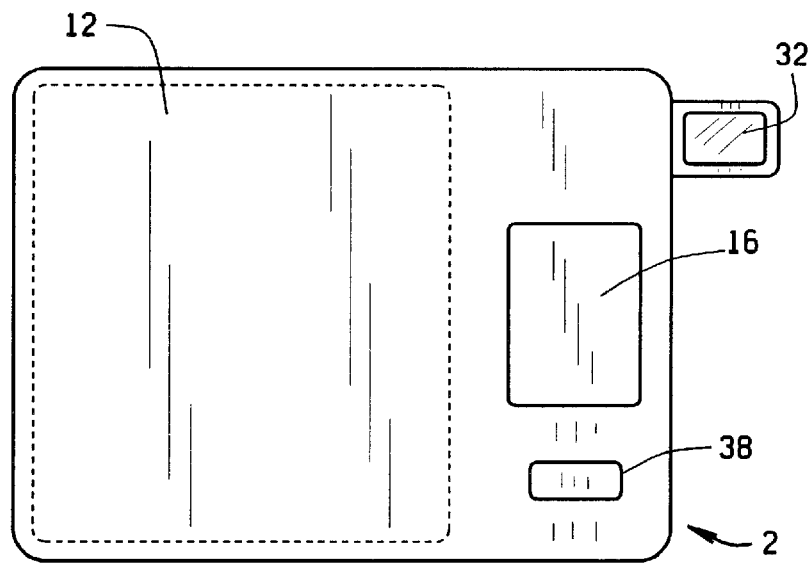
FIG. 5A is a top plan view of the cutting board in an alternative embodiment showing the visual display is mounted to the cutting board.
Figure 5B:
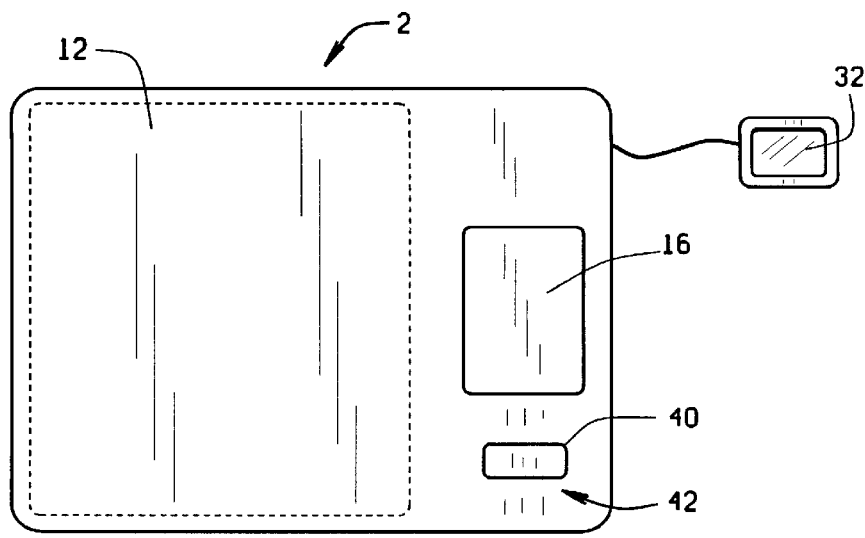
FIG. 5B is a top plan view of the cutting board in an alternative embodiment showing the visual display connected to the cutting board by a connector cable.

In the preferred embodiment of the housing 10 shown in FIG. 3, the top surface 11 further includes an opening 30 sized to accommodate a display window 34 of a visual display 32 therein such that the display window 34 is substantially co-planar with the cutting surface 12 (see also, FIG. 1). The visual display preferably is a digital display such as, for example, a liquid crystal display (LCD) or a light emitting diode (LED) display. In this configuration, the display 32 is driven by a display driver 104 (shown in FIG. 10 and discussed below). The visual display 32 and associated electrical components are disposed in the cavity 15 of the housing 10 via the opening 30. In the preferred embodiment, the continuous membrane covers the display window to prevent food or fluid entry into the cavity 15 of the housing. Alternatively, a sealant 31 can be inserted in a gap between the periphery of the display window 34 and edges 35 of the opening 30 to prevent any foreign matter such as food or food juices from seeping into the cavity 15 of the housing 10 (see FIG. 1). The display window 34 of this embodiment is constructed from a scratch-resistant material so that visibility is not obscured if a knife or cutting device accidentally scrapes the display window 34. In additional alternative embodiments of the present invention shown in FIGS. 5A and 5B, the display 32 can be located as a separate unit, either mounted on a side of the cutting board 2 (FIG. 5A) or connected to the cutting board by wires (FIG. 5B).

Figure 6:
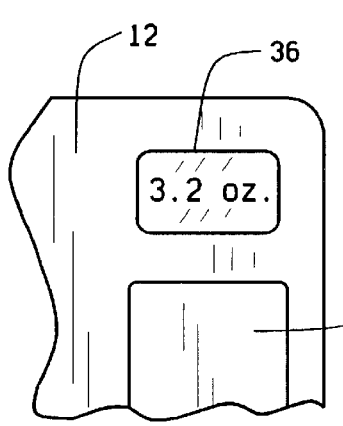
FIG. 6 is a fragmentary top plan view of the cutting board showing the visual display.

The display window 34 preferably is clear, allowing the user to view a readout 36 of the scale 20. The readout 36 preferably is an alpha-numeric digital display (FIG. 6) that conveys requested information such as, for example, the weight of the load on the scale 20, and is capable of displaying weight in alternative systems of weight, such as ounces or grams. As discussed below and shown in FIG. 10, the cutting board 2 includes microprocessor 100 based electronic circuitry which interprets the weight measured by the scale 20 and directs the readout 36 to display information such as, e.g., a value representative of the measured weigh in a selected unit of measurement (grams or ounces).

Figure 11:
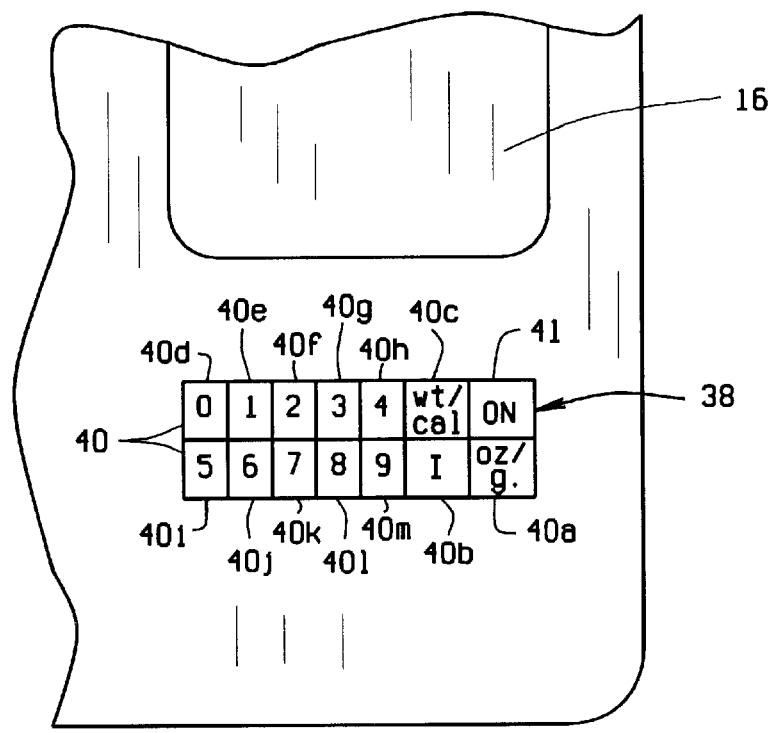
FIG. 11 is a fragmentary top plan view of the cutting board showing one embodiment of the control panel.

In the preferred embodiment, the cutting board 2 also includes a control panel 38 having one or more selector switches 40, as depicted in FIG. 11 that allow the user to input information such as, e.g., specifying certain parameters to be measured or displayed. In one embodiment, the cutting board includes a unit selector switch 40a that allows the user to manually select the units of measurement, for example, grams or ounces, to be displayed on the readout 36 when the food is weighed on the scale 20.

The top surface 11 preferably includes an opening 42 adapted to accommodate the control panel 38 and associated selector switches 40. The control panel is disposed in the cavity 15 and opening 42 so that the switches 40 are substantially co-planar with the cutting surface 12 and sealed by the continuous membrane 14 covering the top surface 11 to prevent food and fluid entry into cavity 15. The selector switches 40 preferably are membrane touch switches in this embodiment. Alternatively, the selector switch 40 can be recessed from the top surface 12 as to prevent damage to the selector switch 40 caused by errant cutting with a knife or cutting device. In other alternative embodiments, the selector switch 40 can be located on the side of the cutting board or separately without deviating from the scope of this invention.

The control panel 38 can include selector switches 40 that allow the user to choose between various display options, such as, for example, specifying whether weight or calories is to be displayed, selecting the orientation of the display 32 or identifying the food on the cutting board so the microprocessor 100 can determine the calories associated with that food quantity based upon preprogrammed data representative of calories per unit of weight (e.g., grams or ounces) for particular foods or user input data representative of calories per unit of weight for that food. The microprocessor 100 also can be programmed to calculate a total number of servings for the particular food quantity disposed on the scale based upon the number of servings per unit of weight, and the serving information can then be displayed on the display 32, if selected by the user as the display option.

As depicted in FIG. 11, the control panel 38 preferably includes the following selector switches 40: selector switch 40a labeled with the symbol "oz/g" for selecting ounces or grams as the unit of measurement; selector switch 40b labeled with the abbreviation "I" for inverting the orientation of alphanumeric display; selector switch 40c labeled with the abbreviation "Wt/Cal" for selecting either weight or calories; and selector switches 40d, 40e, 40f, 40g, 40h, 40i, 40j, 40k, 40l, and 40m, labeled with numbers 0, 1, 2, 3, 4, 5, 6, 7, 8, and 9, respectively, for identifying the food type being weighed so the microprocessor 100 can properly calculate requested information, such as, for example, the calories for that quantity of food or the total number of servings for that quantity of food.

Such calculations can be based upon preprogrammed data for each food (e.g., calories per unit of weight or servings per unit of weight), or user input data. When preprogrammed data is used for various foods, the series of numbers can be keyed as to describe a code corresponding to a preprogrammed list of foods. In this embodiment utilizing codes corresponding to a preprogrammed list of foods, a booklet can be included with the cutting board 2 which categorizes and lists various foods, their corresponding codes and associated pre-programmed information. Scrolling keys (not shown) also can be provided in the control panel that allow a user to sequentially scroll through a list of food types that are stored in a memory device to select the particular food being used. Alternatively, the series of numbers can be used by the user to enter information such as, for example, calories per unit of weight or servings per unit of weight for a particular food. In still another alternative embodiment, such numbered keys can be replaced by abbreviations, words or icons representing singular foods. It is contemplated that still additional or different keys, switches or input devices can be included in the control panel to assist the user in identifying the particular food being evaluated and specifying the food characteristics to be displayed (e.g., fat content, fiber content or protein content).

Figure 8:
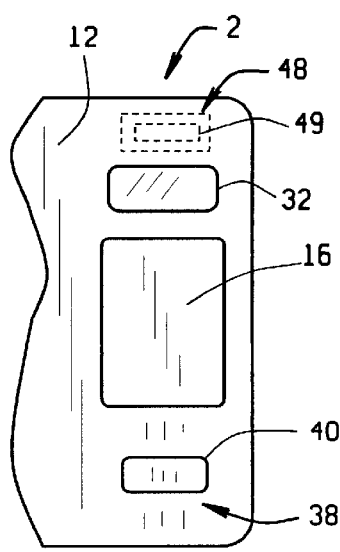
FIG. 8 is a top plan view of an alternative embodiment of the cutting board that is battery powered.
Figure 9:
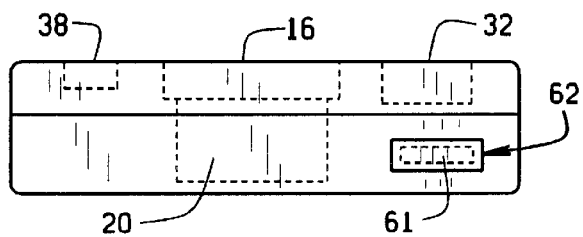
FIG. 9 is a side elevational view of the cutting board showing an opening for installation and replacement of a battery.

In embodiments in which the readout 36 is digital or other electrical components are used which require electrical power, the cutting board 2 includes a power supply 48. In the preferred embodiment, shown in FIG. 8, the power source 48 is a battery 49 that is disposed within the cavity 15 of the housing 10. In this configuration, the housing 10 preferably includes a removable access panel 61 releasably secured about an opening 62 in the housing 10 to allow access to the battery 49 for installation and replacement of the battery 49, depicted in FIG. 9. The access panel 61 preferably is disposed on the side of the housing 10, though it may also be located on the bottom of the cutting board 2. The access panel 61 also seals the opening 62 to prevent food, liquid, washing solution, or the like from entering the cavity 15 of the cutting board 2. The size of the scale 20 and readout 36, and the use of the cutting board 2, determine the power requirements for the battery 49. A battery 49 provides greater mobility and ease of use, as well as obviates the need to connect to a local alternating current power source.

Figure 7:
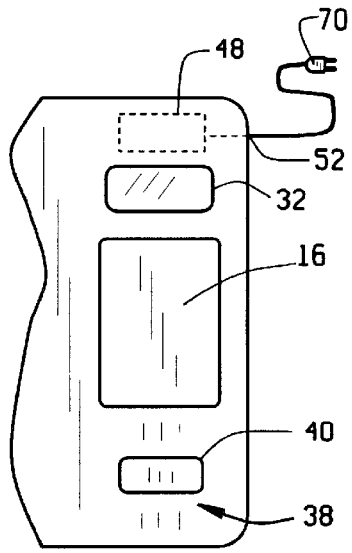
FIG. 7 is a top plan view of an illustrative embodiment of the cutting board showing the cutting board powered by alternative current power.

In an alternative embodiment, shown in FIG. 7, a power cord 70 supplies power to the electrical components from an alternating current power source via an AC/DC adapter (not shown). However, use of the power cord 70 to supply necessary power limits the mobility of the cutting board 2. In addition, the cutting board 2 preferably includes an opening in the body 10 into which the power cord 70 is inserted in this configuration. A tight seal 52 is provided between the power cord 50 and the body 10. The power cord 70 also is susceptible to damage by cutting utensils and other safety concerns when used in a kitchen environment.

The control panel 38 preferably also includes an activation or "on" switch 41 that is pressed by the user to selectively energize the electronic scale 20 and electrical components via the power source 48. In the preferred embodiment, the scale 20 and electrical components are de-energized after no load or food is detected on the scale 20 for a predetermined period of time (e.g., 60 seconds) to conserve power usage. When the activation switch 41 is pressed in the preferred embodiment, the microprocessor 100 automatically "zeros" the scale, establishing a zero reference point to be used in evaluating the weight of food subsequently placed on the scale.

Figure 10:
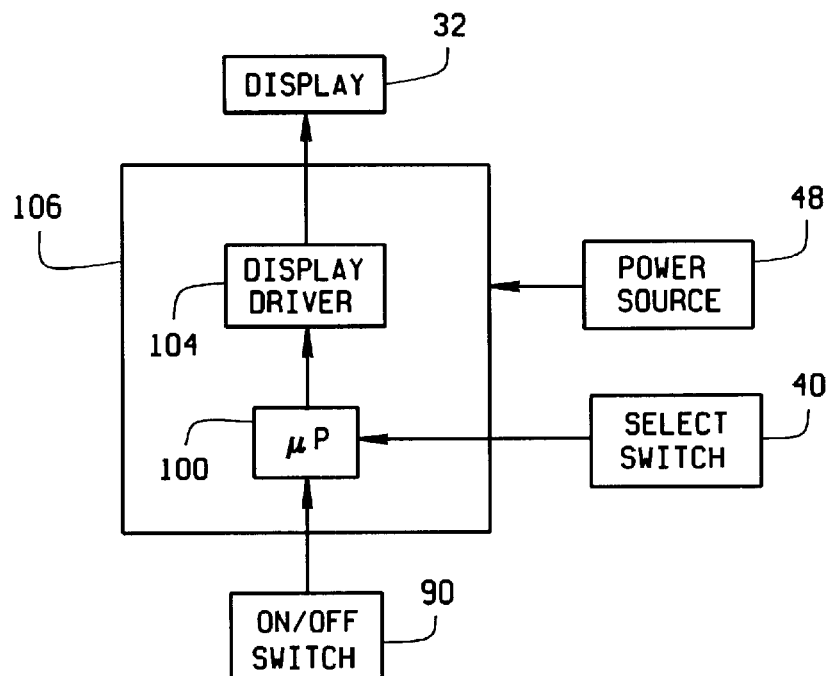
FIG. 10 is a schematic drawing of the circuitry associated with the cutting board.

FIG. 10 sets forth a schematic diagram generally showing electrical components associated with an illustrative embodiment of the present invention mounted on a circuit board 106. In this embodiment, a microprocessor 100 is provided to control operation of the visual display based upon data generated by the scale 60 and the position of the selector switch 40. The microprocessor controls the visual display 32 via a display driver 104. When the control panel 38 does not include activation switch 41, the cutting board can include an on/off switch 90 that is mounted to the housing to allow the user to selectively energize the electrical components when the user wishes to weigh food on the scale 60 and deenergize the components when the scale is not in use. When the activation switch 41 is employed, the microprocessor 100 preferably is programmed to automatically turn off or enter a stand-by mode when no objects are placed on the scale for a predetermined period of time to conserve battery life.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A cutting board for use in food preparation comprising:
    a housing;
    a cutting surface disposed on said housing;
    a scale disposed on said housing adjacent said cutting surface;
    a contiguous membrane sealing said housing, said cutting surface, and said scale against fluid entry, whereby food prepared on said cutting surface may be transferred to said scale over said contiguous membrane;
    a visual display for indicating one or more properties of food disposed on said scale; and
    a selector switch allowing a user to select between a first desired orientation of said visual display and a second desired orientation of said visual display, said second desired orientation inverted from said first desired orientation.

2. The cutting board as set forth in claim 1 further including:
    at least one input device allowing a user to input information representative of a particular type of food disposed on said scale;
    data processing circuitry in communication with said input device for generating data representative of the particular food disposed on the scale; and
    said visual display providing information representative of the data generated by the data processing circuitry.

3. The cutting board as set forth in claim 2 wherein the data processing circuitry generates data representative of a caloric content of the food disposed on the scale, said visual display providing information representative of the caloric content of the food.

4. The cutting board as set forth in claim 2 wherein the data processing circuitry generates data representative of a fat content of the food disposed on the scale, said visual display providing information representative of the fat content of the food.

5. The cutting board as set forth in claim 2 wherein the data processing circuitry generates data representative of a fiber content of the food disposed on the scale, said visual display providing information representative of the fiber content of the food.

6. The cutting board as set forth in claim 2 wherein the data processing circuitry generates data representative of a protein content of the food disposed on the scale, said visual display providing information representative of the protein content of the food.

7. The cutting board as set forth in claim 2 wherein the data processing circuitry generates data representative of a total number of servings associated with the food disposed on the scale, said visual display providing information representative of the total number of servings of the food.

8. The cutting board as set forth in claim 3 further including a selector switch allowing the user to alternatively select weight or calories to be displayed on the visual display.

9. The cutting board as set forth in claim 1 wherein said scale is electrical and said visual display is digital, said scale and said visual display being electrically connected to a power source.

10. The cutting board as set forth in claim 9 wherein the power source includes a battery located within the cutting board.

11. The cutting board of claim 1 wherein said visual display is configured to indicate a measure of weight of food disposed on said scale.

12. The cutting board of claim 1 wherein said scale is configured to move vertically relative to said housing independently of said cutting surface.

13. The cutting board of claim 1 wherein said contiguous membrane is flexible.

* * * * *